United States Patent [19]

Kastl et al.

[11] 4,416,846
[45] Nov. 22, 1983

[54] NUCLEAR POWER PLANT WITH COOLING CIRCUIT

[75] Inventors: Hans Kastl, Neustadt an der Waldnaab; Georg Gugel, Kalchreuth, both of Fed. Rep. of Germany

[73] Assignee: Kraftwerk Union Aktiengesellschaft, Mülheim, Fed. Rep. of Germany

[21] Appl. No.: 284,188

[22] Filed: Jul. 17, 1981

Related U.S. Application Data

[63] Continuation of Ser. No. 63,441, Aug. 3, 1979, abandoned.

[30] Foreign Application Priority Data

Aug. 10, 1978 [DE] Fed. Rep. of Germany ....... 2835082

[51] Int. Cl.$^3$ ............................................. G21C 17/00
[52] U.S. Cl. ...................................... 376/249; 376/289
[58] Field of Search ................ 376/249, 245, 289, 291

[56] References Cited

U.S. PATENT DOCUMENTS

| | | | |
|---|---|---|---|
| 3,930,942 | 1/1976 | Thome | 376/249 |
| 3,934,457 | 1/1976 | Clark et al. | 376/249 |
| 3,988,922 | 10/1976 | Clark et al. | 376/249 |
| 4,169,758 | 10/1979 | Blackstone et al. | 376/249 |

FOREIGN PATENT DOCUMENTS

2726547 12/1978 Fed. Rep. of Germany ...... 376/249

*Primary Examiner*—Sal Cangialosi
*Attorney, Agent, or Firm*—Herbert L. Lerner

[57] ABSTRACT

A nuclear power plant with a metallic, circulatory cooling loop formed with welding seams and including, as components thereof, a reactor pressure vessel, a heat consumer and a pump, as well as a coolant line connecting the components to one another, and thermal insulation provided on the cooling loop, the welding seams being testable by a track-traversing testing device, including a multiplicity of fixedly installed tracks having like profile and being associated, respectively, with welding seams on the components and the cooling line, at least part of the thermal insulation being in vicinity of the tracks and being formed as removable cassettes.

13 Claims, 8 Drawing Figures

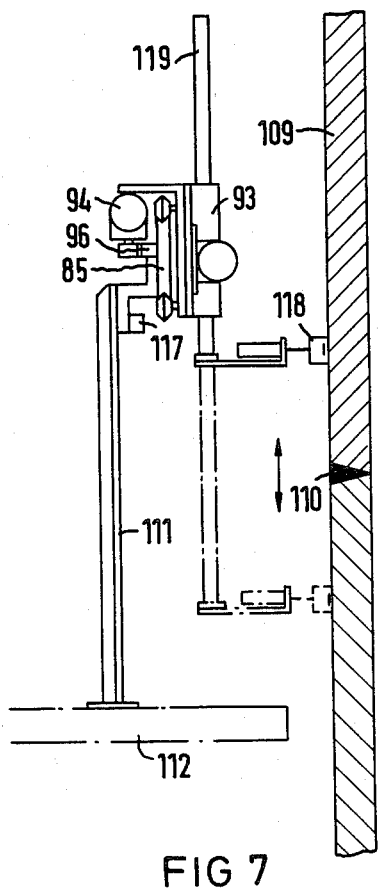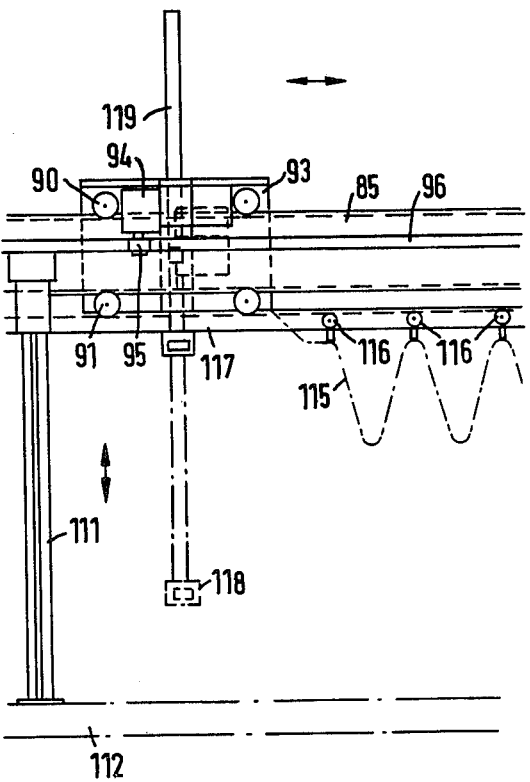
FIG 7
FIG 8

NUCLEAR POWER PLANT WITH COOLING CIRCUIT

This is a continuation division of application Ser. No. 063,441, filed Aug. 3, 1979 now abandoned.

The invention relates to a nuclear power plant with a metallic cooling circuit or circulatory cooling loop and, more particularly, to such a cooling loop which is formed with welding seams and includes, as components thereof, a reactor pressure vessel, a heat consumer and a pump, as well as a coolant line connecting the components to one another, and further provided with thermal insulation, the welding seams being testable or checkable by a track-traversing testing device, such as an ultrasonic testing device, especially.

As has been shown, for example, in U.S. Pat. No. 3,930,942, such tracks have been provided heretofore only on individual parts and, indeed, as a movable structure, the just-mentioned U.S. patent disclosing such tracks, which are associated with the bottom of a reactor pressure vessel and serve to guide a television camera, as being movably disposed on a carriage which, in turn, is able to travel on tracks or rails. The last-mentioned tracks are set into the floor of the reactor building beneath the pressure vessel, so that no exact association thereof with the reactor pressure vessel is possible.

It is an object of the invention to provide a nuclear power plant with a circulatory cooling loop which affords a reduction in employment of personnel for testing and checking, since the parts of the coolant loop to be tested or checked are radioactively contaminated. Therefore, the highly skilled personnel employed for the testing or checking is subject to radiation when the test equipment is installed, which places a severe time limit upon the employment of the personnel.

With the foregoing and other objects in view, there is provided, in accordance with the invention, a nuclear power plant with a metallic circulatory loop formed with welding seams and including, as components thereof, a reactor pressure vessel, a heat consumer and a pump, as well as a coolant line connecting the components to one another, and thermal insulation provided on the cooling loop, the welding seams being testable by a track-traversing testing device, comprising a multiplicity of fixedly installed tracks having like profile and being associated, respectively, with welding seams on the components and the cooling line, at least part of the thermal insulation being in vicinity of the tracks and being formed as removable or detachable cassettes.

With the invention of the instant application, the installation of the tracks is eliminated. It is necessary only to set the test device upon the tracks, unless the invention is embodied in such a manner that a test device, which is not to be removed after the test, is already associated with all of the tracks. In any case, virtually all of the parts of the coolant loop that are to be checked or tested can be remotely controlled to a very great extent as soon as the test device is seated on the track, and the thermal insulation, which is provided in the form of cassettes optimized for installation and removal, has been removed.

Identical construction of all of the tracks affords testing with a test device which operates in the same manner at all the welded seams so that evaluating equipment connected to the test device can also always be the same. This facilitates comparative measurements and spares any necessity for training personnel on different test devices.

In accordance with another feature of the invention, the tracks are fastened to the components and to the coolant line at respective regions thereof at which a non-removable part of the thermal insulation is located, releasable connections being provided between the cassettes and the non-removable part of the thermal insulation. The tracks or the means for fastening the same may be used, in this regard, for installing or attaching the fixed part of the thermal insulation.

In accordance with a further feature of the invention, the tracks are fastened to stationary building parts surrounding the components and the coolant line, the tracks being fastened to the building parts and the thermally insulating cassettes being disposed between the tracks and the respective components and coolant line, the side of the tracks facing towards the respective cassettes being traversible by the testing device. In this case, the cooling loop can be constructed entirely independently of the test devices i.e. without having to take the layout of the tracks, possibly for thermal expansions of the coolant loop, into consideration.

The cassettes can also be fastened to the tracks or the supports therefor. In accordance with an added feature of the invention, preferably, the tracks are fastened to the components and to the coolant line at respective regions thereof at which a non-removable part of the thermal insulation is located, the non-removable part of the thermal insulation being fastened to the tracks or to the supports thereof and, in turn, carrying the cassettes. The cohesion of the thermal insulation is thereby assured even for thermal movements, and the accessibility of the welding seams that are to be checked or tested is not impaired due to other fastening means for the thermal insulation.

In accordance with an additional feature of the invention, the circulatory cooling loop includes a pipe elbow, at least one of the tracks being of annular construction and surrounding the pipe elbow, and further including a stationary support, the one track extending outwardly from the stationary support along a circular arc coincident with the axis of the pipe elbow.

In accordance with yet another feature of the invention, the stationary support comprises a pivot shaft coincident with the center of curvature of the circular arc.

It is also possible to provide a guide for the track on the elbow itself. In this way, a further track, which would otherwise be necessary for testing or checking longitudinal welding seams on the pipe elbow, is dispensed with.

In accordance with yet a further feature of the invention, the tracks are provided with removable protective plates, in order to prevent disturbances due to soiling during the operation or due to other effects or influences. The same as for the removable thermal insulation, in accordance with yet an added and especially preferred feature of the invention, the protective plates are also releasable to such an extent by the traveling test device per se that the test device travels unimpededly on the tracks.

The tracks can have toothed racks, link chains or serrated belts which provide for reliable and reproducible adjusting movement of the test device through form-locking engagement. These parts preferably should be able to be covered by the protective plates mentioned hereinbefore.

In accordance with another feature of the invention, a guide for measuring cables is combined with the tracks. Such a guide, due to a suitably defined suspension, provides for the measuring cables to follow the test device with a minimal expenditure of force or power. Such guides can be constructed similarly to guide rails or tracks for curtains so that the cables are fastened onto rollers drawn behind the test device and extend therebehind in loop-like suspension with a length adequate for a maximal distance.

In accordance with a further feature of the invention, the guide terminates in a radiation-proof test observation station. In such a test observation station, several measuring cables can be disposed so as to be applicable for individual sections or differently extending tracks, especially if tracks of varying length are used.

The tracks are supposed to facilitate the remotely actuated and remotely controllable application or use of the test device. To this end, it is sufficient, in itself, if the test device is guided in given or predetermined paths. Support of the test device is not absolutely necessary since the test device can be guided, with the aid of the tracks, in such a manner along the metallic parts of the coolant loop, which are to be checked or tested, that the test device is supported thereat. For this purpose, in accordance with an added feature of the invention, the test device has magnetically adhering rollers which are constructed either as permanent magnets or as electromagnets. With such rollers, the test device can, moreover, also be guided on the tracks which are made of steel.

The test device is preferably an ultrasonic test head. It can, however, also be operated with eddy-current measuring devices, x-ray devices or the like. In accordance with an additional feature of the invention, in any event, there are provided a base carriage traversible on the tracks, an arm or jib supported on the base carriage, the test device being carried by the arm, and a drive motor for displacing the arm, the drive motor being controlled by a programmable memory or storage. Thus, continuous remote control can be dispensed with, because the drive motor can be guided or led over the tracks by a preferably electromagnetically recorded program.

In accordance with a concomitant feature of the invention, the base carriage has a device for programming the storing or memory associated with the tracks. This means that the base carriage, during the first application or use thereof, is guided by manual actuation, if desired or necessary, by remote control, and the movement occurring in accordance with the guidance is recorded by the memory or storage so that subsequent test movements along the tracks can be effected by means of control from the memory or storage. Such "teachable" industrial robots which are known per se, offer a great advantage in connection with the invention, in that the programming may be effected before the components to be tested and checked, as well as the fixedly installed tracks therefor, are radioactively contaminated. A time-consuming fine adjustment can then yet be made, which is kept until later, owing to the stationary tracks provided in accordance with the invention.

Other features which are considered as characteristic for the invention are set forth in the appended claims.

Although the invention is illustrated and described herein as embodied in a nuclear power plant with circulatory cooling loop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings in which.

Figure 1:
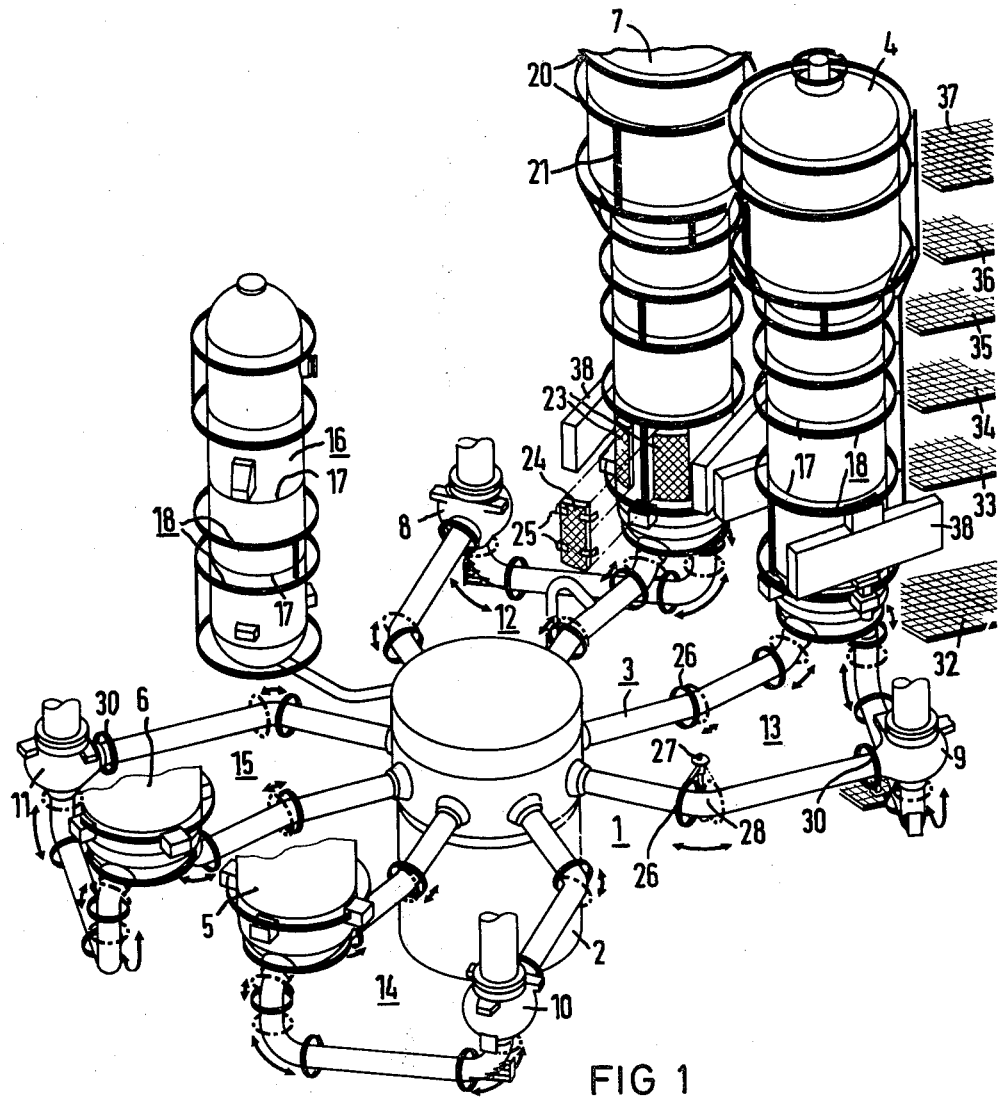
FIG. 1 is a diagrammatic perspective view of a nuclear power plant with a circulatory cooling loop incorporating the invention.
Figure 6:
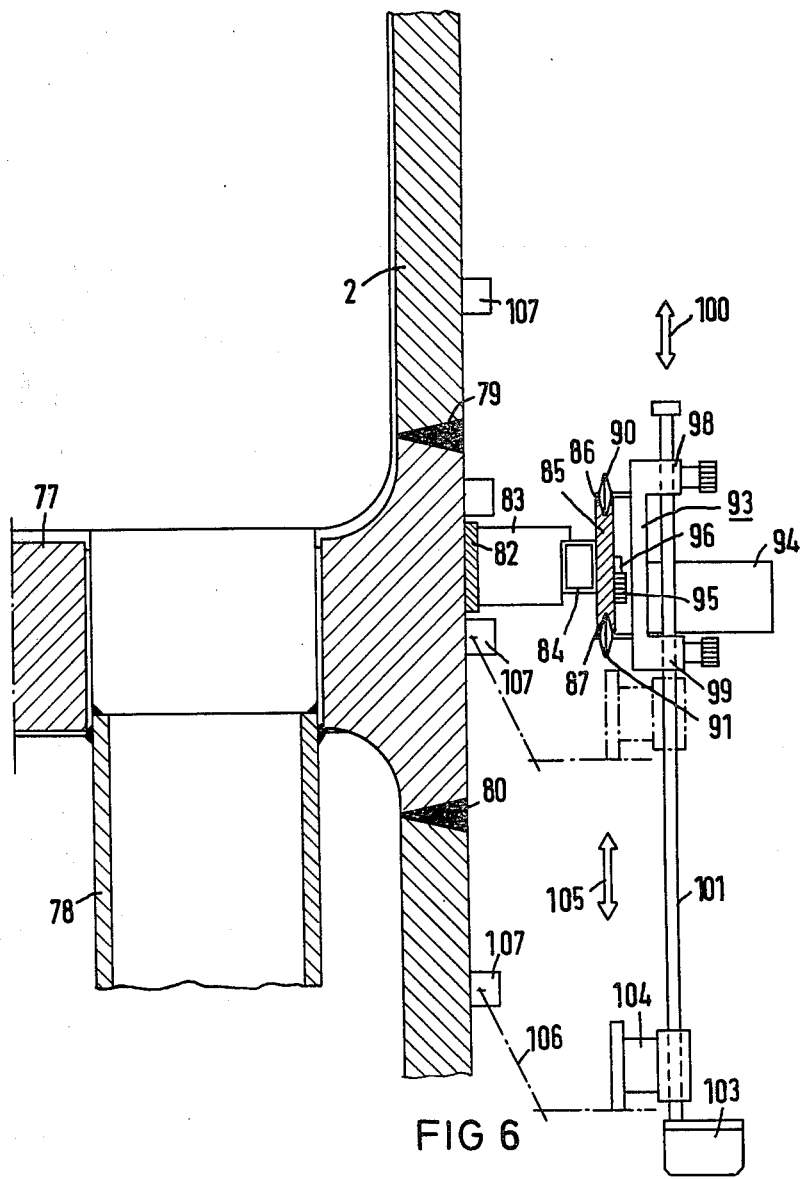

FIG. 6 is a fragmentary, enlarged sectional view of the reactor pressure vessel of FIG. 1 with a third embodiment of the invention for testing the wall of the pressure vessel; and FIGS. 7 and 8 are fragmentary, enlarged sectional and elevational views, respectively, of FIG. 1 showing a fourth embodiment of the invention for testing a vertical wall with a welding seam associated with the cooling loop of the nuclear power plant.

Referring now to the drawing and first, particularly, to FIG. 1 thereof, there is shown in a simplified perspective view a circulatory cooling loop 1 of a nuclear power plant having a pressurized water reactor. A central component of the cooling loop 1 is a steel reactor pressure vessel 2 from which there extend coolant lines generally referred to as a whole by reference numeral 3. Four steam generators 4 to 7, of which only the steam generator 4 is shown in its entirety while the others are shown partly broken away for reasons of clarity, are grouped around the reactor pressure vessel 2. The steam generators 4 to 7 are also formed of steel.

A main coolant pump 8, 9, 10, 11 is serially connected, respectively, to each of the steam generators 4 to 7 so that the circulatory cooling loop 1 of the pressurized water reactor encompasses four similar loops 12, 13, 14 and 15. Another component of the cooling loop 1, namely, a pressurizer 16, is connected to the reactor pressure vessel 2. The pumps 8 to 11, the pressurizer 16 and the coolant lines 3 connecting all of the components of the cooling loop 1 are formed of steel since the primary cooling water received therein is under a pressure of 160 bar at temperatures of more than 300° C.

A multiplicity of welds or welding seams 17 are present on the cooling loop 1 of the pressurized water reactor and, in accordance with safety regulations premulgated by appropriate authorities, must be checked not only at manufacture but also thereafter, at given time intervals, so that the mechanical strength thereof and, especially the freedom thereof from cracks are assured.

Fixedly installed tracks 18 are, respectively, associated with all of the welding seams 17 and permit scanning of the welding seams 17 with a non-illustrated remotely controllable testing device, especially with ultrasonic test heads. Because of the close association of the welding seams 17 and the tracks 18, a more detailed representation of the welded seams was dispensed with in FIG. 1. In the embodiment of the invention of FIG. 1, the tracks 18 are not shown as being provided for the reactor pressure vessel 2 but rather only for the other components of the circulatory cooling loop 1.

The tracks 18 at the steam generators 4 to 7, include, for one, so-called circular-seam tracks 20 which are nine in number distributed over the height of the respective steam generators 4 to 7. Between the circular-seam tracks 20, longitudinal seam tracks 21 extend along surface lines of the respective steam generators 4 to 7 in accordance with longitudinal welding seams disposed thereat on the individual cylindrical or conical shells or casings of which the steam generators 4 to 7 are assembled.

Part of a fixedly applied thermal insulation 23, which surrounds the entire cooling loop 1 and has a thickness, for example, of at least 100 mm, is shown at one of the longitudinal-seam tracks 21 in FIG. 1. It is further apparent in FIG. 1 that the thermal insulation 23 is formed so as to be removable directly beneath the track 21 i.e. between the track 21 and the outer surface of the respective steam generator 4 to 7, by means of cassette-like members 24. The cassettes 24 usually have a rectangular cross section, as shown in FIG. 1, and are of such size as to be capable of being readily handled in that they weigh, for example, not more than about 20 to at most 50 kilopond (Kp) and are able to be connected to the stationary thermal insulation 23 by easily releasable fast-acting locking devices 25. Since this applies to all regions of the thermal insulation 23 located in vicinity of the tracks 18, the seams located thereat can be made readily accessible for the testing or checking operation.

Additional annular tracks 26 are associated with circular and longitudinal welding seams on the coolant line 3. The tracks 26 extend from a respective stationary support 27 over elbows 28 forming part of the coolant line 3, as will be described hereinafter in greater detail.

Stationary annular tracks 30 are associated with other circular seams on the cooling lines 23. In the embodiment of FIG. 1, this is shown in vicinity of the main coolant pumps 8 to 11.

The tracks 18, generally, inclusive of the specifically identified tracks 20, 21, 26 and 30, are all of similar construction with regard to the data essential for the use of such tracks 18 by a testing or checking device. Among such essential data are, primarily, the track profile or section, as well as, also the minimal permissible curvature or bend, and the like. The tracks 18 may, for example, have toothed racks, link or sprocket chains or serrated or toothed belts in order to produce a form-locking connection with testing or checking devices. Moreover, the tracks 18 may be combined with a guide for measuring cables, supply cables and the like.

In the embodiment of the invention shown in FIG. 1, the tracks 18 are fastened to parts of the building surrounding the components 1, 4 to 11 and 16 and the coolant lines 3. Such building parts, in the embodiment of FIG. 1, are represented by platforms or scaffolds 32 to 37 which are disposed above one another, distributed over the height of the steam generators 4 to 7 at a mutual spacing of several meters. Because of the support afforded by these platforms 32 to 37 to the tracks 18 independently of the cooling loop 1, the tracks 18 cannot have any adverse effect upon the components of the cooling loop 1 and the thermal insulation 23, 24 thereof. For this case, the testing devices can be constructed so that they travel on the side of the tracks 18 associated with the welding seams 17. Other possibilities for mounting the tracks 18 are offered by the illustrated supports 38 of the steam generators 4 to 7.

Figure 3:
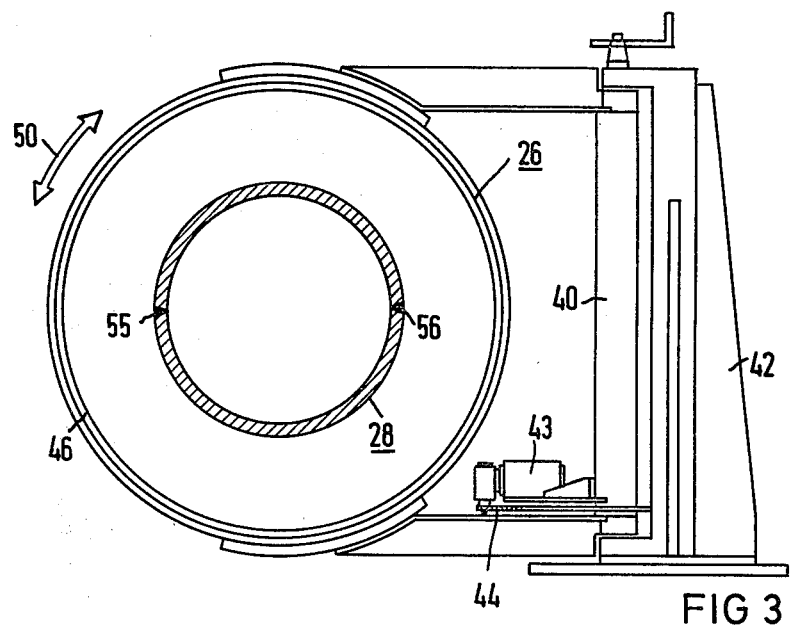
FIGS. 2 and 3 are fragmentary, enlarged plan and sectional views, respectively, of FIG. 1 showing the disposition of annular tracks forming part of the invention.
Figure 2:
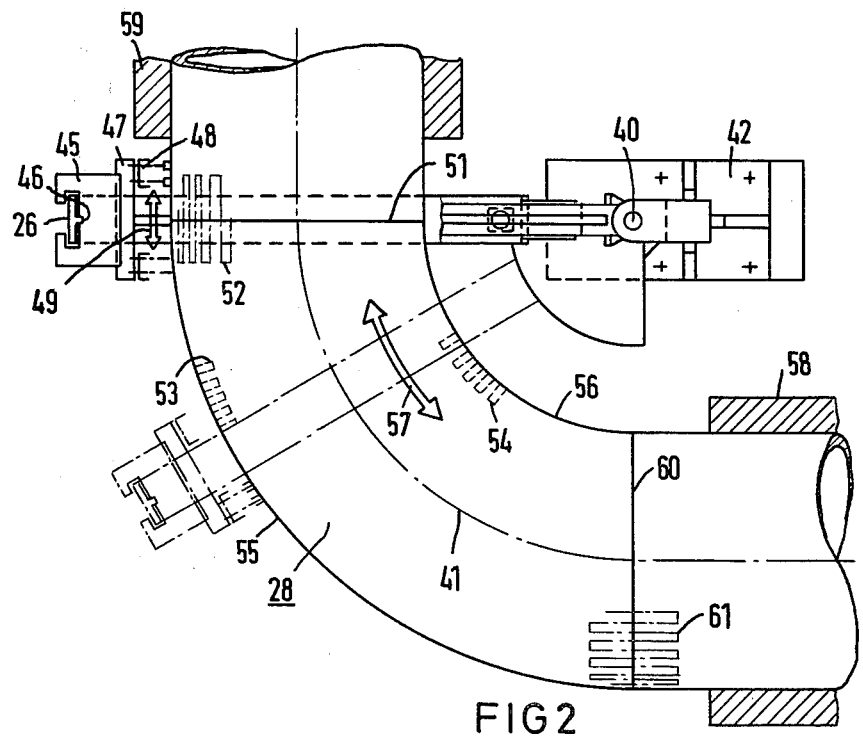

In FIGS. 2 and 3, the disposition of the annular tracks 26 is shown in two mutually perpendicular enlarged views (vertical cross-sectional and top plan views, respectively). The annular tracks 26 are fastened in vicinity of elbows 28 of the coolant line 3 to a pivot shaft 40 in which the center of the circular arc 41 of the axis of the elbows 28 is located. The pivot shaft 40, which is fastened by a bracket or stand 42, for example, to one of the platforms 32 to 37 (FIG. 1), can be moved by a motor 43 which acts through a pair of teeth 44 and is connected to a position transmitter in order to permit a reproducible test or check.

A base carriage 45 is guided along the annular track 26 and is in engagement, on the side thereof facing the elbow 28, with a gear ring 46, and has an arm 47 thereat. A test head system 48 for ultrasonic testing is located on the arm 47 and is reciprocable in direction of the double-headed arrow 49. Since the base carriage 45 can travel on the track 26 in direction of the curved double-headed arrow 50, it is possible to scan the circular seam indicated at 51 in FIG. 2 on a meandering or sinusoidal test path 52. An equally meandering or sinusoidal test path, as shown at 53 and 54, can be traversed also over longitudinal seams 55 and 56, respectively, of the elbow 28. For this purpose, with the base carriage 45 stationary, the annular track 26 is pivoted or swung by the motor 43 in direction of the arcuate double-headed arrow 57. The thermal insulation 23 removed for the test is not shown in FIGS. 2 or 3. Only the adjoining regions 58 and 59 of the fixed thermal insulation are visible in FIG. 2. In the other end position of the annular track 26 shown in FIG. 2 i.e. in the position thereof to which it has been rotated counterclockwise through an arc of 90°, the circular seam 60 can be covered on the sinusoidal test path 61.

Figure 4:
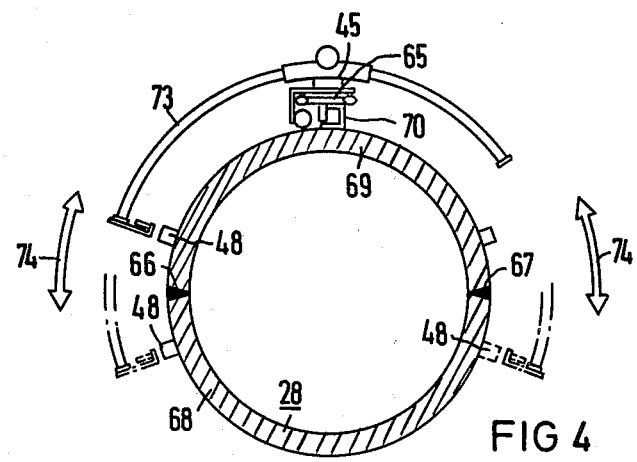
FIGS. 4 and 5 are fragmentary, enlarged sectional and plan views, respectively, of FIG. 1 showing another embodiment of the invention which includes a longitudinal track for testing an elbow bend.
Figure 5:
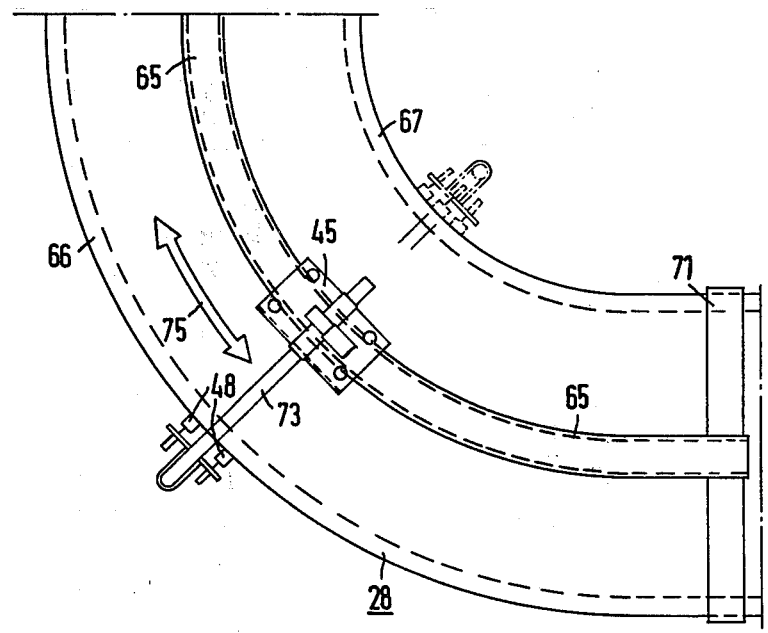

In the embodiment of FIGS. 4 and 5 there is shown another possible way of testing an elbow 28 in accordance with the invention. In this case, a track 65 extends parallel to the axis of the elbow 28 which is formed of two half-shells 68 and 69 that have been joined by welded seams 66 and 67. The tracks 65 has a rectangular profile or section formed with V-shaped slots at the narrow sides thereof. It is seated by means of a support 70 on the elbow 28 and is attached by a strap 71.

The base carriage 45, in the embodiment of FIGS. 4 and 5, has a curved rod 73 with a center of curvature coincident with that of the surface of the pipe elbow 28 i.e. the curved rod 73 in so-called arcuate parallelism to the surface of the pipe elbow 28, the rod 73 forming an arm or jib for guiding the ultrasonic test head 48. Thus, the test head 48 can be adjusted along a circular arc over the pipe cross section as indicated by the arcuate double-headed arrows 74. In addition, the region of the longitudinal seams 66 and 67 of the elbow 28 to be tested can be scanned by adjustably displacing the base carriage 45 along the track 65 in direction of the curved double-headed arrow 75.

In FIG. 6, the wall and bottom 77 of the reactor pressure vessel 2 are shown in a fragmentary sectional view, a nozzle or connecting piece 78, for example, for installation of non-illustrated pumps, being provided in the pressure-vessel bottom 77. In vicinity of the pressure-vessel bottom 77, two welding seams 79 and 80 are provided, which are tested or checked non-destructively for cracks by the ultrasonic method, at given intervals of time. To this end, a strap 82 which carries support ribs 83 is fastened on the reactor pressure vessel 2. A box girder or beam 84 of rectangular section or profile is mounted on the support ribs 83. The box girder 84 carries a guide rail 85 having a section or profile in the form of a rectangle with V-shaped notches 86 and 87 formed therein at the opposite narrow sides thereof, as shown in FIG. 6.

Guide rollers 90 and 91 of a base carriage 93 ride in the notches 86 and 87, respectively, the base carriage 93 having a drive motor 94 with a pinion 95 actuated thereby through a transmission. The pinion 95 meshes with a toothed rack 96 which is fastened to the guide rail 85. The base carriage 93 can thereby travel reproducibly along the guide rail 85.

The base carriage 93 carries two guides 98 and 99 for an arm or jib 101 adjustably movable in direction of the double-headed arrow 100. A test system carrier 104 is adjustably displaceable on the arm 101 through a drive motor 103 in direction of the double-headed arrow 105. A test arm 106, represented by dot-dash lines in FIG. 6, together with an ultrasonic head 107 seated on the free end of the arm 106, thus travels over the regions of the wall to be tested, in the vicinity of the welding seams 79 and 80, as indicated by the various portions of the test head 107 indicated in FIG. 6.

Another embodiment of the invention is shown in the mutually perpendicular views of FIGS. 7 and 8 wherein the guide rail 85 having the same section or profile as in the embodiments of FIGS. 4, 5 and 6 is carried by a support 111 in vicinity of a wall 109 formed with a welding seam 110, the support 111 being fastened to a platform or scaffold 112 adjacent to the wall 109.

In FIG. 8 there is shown a cable 115 represented by a dot-dash line extending behind the base carriage 93, suspended loop-like from rollers 116. The rollers 116 travel in a guide 117 having a rectangular cross section or profile open towards the bottom thereof, as viewed in FIGS. 7 and 8, the rail 85 being associated therewith and extending parallel thereto, since the guide 117 is likewise fastened to the support 111. The cable 115 can be guided directly to the test head 118 or can extend through the arm 119.

There are claimed:

1. A nuclear power plant with a metallic, circulatory cooling loop formed with welding seams and including, as components thereof, a reactor pressure vessel, a heat consumer and a pump, as well as a coolant line connecting the components to one another, and thermal insulation provided on the cooling loop, the welding seams being testable by a track-traversing testing device, comprising a multiplicity of fixedly installed tracks having like profile and being associated, respectively, with welding seams on the components and the cooling line, at least part of the thermal insulation being in vicinity of said tracks and being formed as removable cassettes.

2. Nuclear power plant according to claim 1 wherein said tracks are fastened to the components and to the coolant line at respective regions thereof at which a non-removable part of the thermal insulation is located, said cassettes having releasable connections with the non-removable part of the thermal insulation.

3. Nuclear power plant according to claim 1, including stationary building parts surrounding the components and the coolant line, said tracks being fastened to said building parts and said thermally insulating cassettes being disposed between said tracks and the respective components and coolant line, the side of said tracks facing towards the respective cassettes being traversible by the testing device.

4. Nuclear power plant according to claim 1 wherein said tracks are fastened to the components and to the coolant line at respective regions thereof at which a non-removable part of the thermal insulation is located, the non-removable part of the thermal insulation being fastened to said tracks and, in turn, carrying said cassettes.

5. Nuclear power plant according to claim 1 including fixed supports for said tracks, said tracks being fastened to the components and to the coolant line at respective regions thereof at which a non-removable part of the thermal insulation is located, the non-removable part of the thermal insulation being fastened to said fixed supports for said tracks and, in turn, carrying said cassettes.

6. Nuclear power plant according to claim 1 wherein the circulatory cooling loop includes a pipe elbow and wherein at least one of said tracks is of annular construction and surrounds the pipe elbow, and further including a stationary support, said one track extending outwardly from the stationary support along a circular arc coincident with the axis of the pipe elbow.

7. Nuclear power plant according to claim 5 wherein said stationary support comprises a pivot shaft coincident with the center of curvature of said circular arc.

8. Nuclear power plant according to claim 1 wherein said tracks are provided with removable protective plates.

9. Nuclear power plant according to claim 1 including a guide for measuring cables carried by said tracks.

10. Nuclear power plant according to claim 9 wherein said guide terminates in a radiation-proof test observation station.

11. Nuclear power plant according to claim 1 wherein the testing device has magnetically adhering rollers.

12. Nuclear power plant according to claim 1 including a base carriage traversible on said tracks, an arm supported on said base carriage, the testing device being carried by said arm, a drive motor for displacing said arm, said drive motor being controlled by a programmable storage.

13. Nuclear power plant according to claim 12 wherein said base carriage has a device for programming said storage associated with said tracks.

* * * * *